United States Patent
Gudapati

(10) Patent No.: US 12,203,546 B2
(45) Date of Patent: Jan. 21, 2025

(54) ENHANCED TECHNIQUES FOR INDEPENDENT SECUREMENT AND IGNITION MANAGEMENT FOR ELECTRIFIED VEHICLES WITH E-SECUREMENT SYSTEMS

(71) Applicant: FCA US LLC, Auburn Hills, MI (US)

(72) Inventor: Abhilash Gudapati, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 79 days.

(21) Appl. No.: 18/183,203

(22) Filed: Mar. 14, 2023

(65) Prior Publication Data

US 2024/0309948 A1    Sep. 19, 2024

(51) Int. Cl.
*F16H 63/34*     (2006.01)
*H04L 12/40*     (2006.01)

(52) U.S. Cl.
CPC ... *F16H 63/3433* (2013.01); *H04L 12/40006* (2013.01); *H04L 2012/40215* (2013.01); *H04L 2012/40273* (2013.01)

(58) Field of Classification Search
CPC .... F16H 63/3433; B60T 7/12; B60T 2270/40; B60T 2201/10
See application file for complete search history.

(56) References Cited

U.S. PATENT DOCUMENTS

| | | |
|---|---|---|
| 9,267,599 B2 | 2/2016 | Pollack |
| 2018/0345931 A1* | 12/2018 | Harries ............... B60T 8/885 |
| 2019/0168730 A1* | 6/2019 | Park ..................... B60T 7/22 |
| 2020/0238959 A1* | 7/2020 | Jeong ................. B60T 17/22 |
| 2020/0406869 A1* | 12/2020 | Hwang ............... B60T 17/22 |
| 2021/0277995 A1* | 9/2021 | Hutchins ............. B60T 8/885 |
| 2022/0410857 A1* | 12/2022 | Li ....................... B60T 8/92 |

* cited by examiner

*Primary Examiner* — Lori Wu
(74) *Attorney, Agent, or Firm* — Jeremy J. Klobucar

(57) ABSTRACT

Independent electronic securement and ignition management techniques for an electrified vehicle includes a park pawl system with primary and a secondary park pawl controllers configured to control park state arbitration and physical movement of a park pawl actuator, respectively, an electric parking brake (ePB), and a vehicle controller connected to the park pawl system via a controller area network (CAN) and configured to detect a malfunction of the park pawl system and, in response to detecting the park pawl system malfunction, automatically command the ePB to engage to inhibit movement of the electrified vehicle and without any input from an operator of the vehicle.

18 Claims, 3 Drawing Sheets

ENHANCED TECHNIQUES FOR INDEPENDENT SECUREMENT AND IGNITION MANAGEMENT FOR ELECTRIFIED VEHICLES WITH E-SECUREMENT SYSTEMS

FIELD

The present application generally relates to electrified vehicles and, more particularly, to enhanced techniques for independent securement and ignition management for electrified vehicles with electronic securement systems.

BACKGROUND

Electrified vehicles include one or more electric motors powered by a battery system and an optional internal combustion engine. Electrified vehicles also typically include a plurality of different controllers or modules in communication via a complex controller area network (CAN). One conventional electrified vehicle securement strategy is engaging a park pawl to lock-up a transmission/driveline and secure the electrified vehicle from moving. In some scenarios, a CAN malfunction could result in the electrified vehicle not being properly shutdown and these conventional securement strategies would be unable to verifiably secure the electrified vehicle. Accordingly, while such conventional electrified vehicle securement strategies may work for their intended purpose, there exists an opportunity for improvement in the relevant art.

SUMMARY

In one example aspect of the invention, an independent electronic securement and ignition management system for an electrified vehicle is presented. In one exemplary implementation, the system comprises a park pawl system comprising a park pawl configured to engage/disengage a driveline of the electrified vehicle to selectively inhibit movement of the electrified vehicle, a park pawl actuator configured to physically move the park pawl actuator between engagement/disengagement positions, and primary and a secondary park pawl controllers configured to control park state arbitration and physical movement of the park pawl actuator, respectively, and an electric parking brake (ePB) configured to engage/disengage to selectively inhibit movement of the electrified vehicle, and a vehicle controller connected to the park pawl system via a controller area network (CAN) and configured to detect a malfunction of the park pawl system and, in response to detecting the park pawl system malfunction, automatically command the ePB to engage to inhibit movement of the electrified vehicle and without any input from an operator of the vehicle.

In some implementations, the malfunction of the park pawl system is one of (i) a loss of communication via the CAN, (ii) a loss of low voltage power from a low voltage battery system of the electrified vehicle, (iii) a software and/or memory corruption, and (iv) a shorted CAN bus. In some implementations, the vehicle controller is further configured to control a powerdown/key-off of the electrified vehicle when the electrified vehicle is properly secured and based on an operator park request. In some implementations, the electrified vehicle powerdown/key-off inhibits drain of at least one of the low voltage battery system and a high voltage battery system of the electrified vehicle.

In some implementations, the CAN is a CAN flexible data rate (CAN-FD) network and the vehicle controller is a brake system module (BSM), and wherein the loss of communication is on a CAN-FD bus and overrides an operator deselection of an ePB auto-hold feature that automatically engages the ePB when the park pawl is engaged thereby keeping the ePB engaged. In some implementations, the CAN is a high-speed CAN (CAN-C) network and the vehicle controller is a body control module (BCM), wherein the loss of communication is on one of a first CAN (CAN-C1) bus and a second CAN (CAN-C2) bus, and wherein signals are added to a remaining operational one of the CAN-C1 and CAN-C2 buses (i) to powerdown the electrified vehicle and (ii) to engage park when requested via the park pawl or, when the park pawl system has malfunctioned, by automatically engaging the ePB.

In some implementations, the park pawl system malfunction is a primary park pawl system controller malfunction that occurs while in drive or while shifting to park and, when not malfunctioning, the secondary park pawl system controller engages the park pawl when a set of conditions are met. In some implementations, the vehicle controller is a brake system module (BSM) and wherein the BSM detects a malfunction indicating one of (i) a loss of communication with the primary park pawl system controller, (ii) a software and/or memory corruption at the primary park pawl system controller, and (iv) a shorted CAN bus. In some implementations, after properly securing and powerdown/key-off of the electrified vehicle, the electrified vehicle is configured to be temporarily woken up in a run prestart mode to provide a period for the ePB to be temporarily disengaged via a technician input and the park pawl to be temporarily disengaged to transfer the electrified vehicle to a towable configuration, and wherein after the period the ePB is reengaged via another technician input and the electrified vehicle is secured and powerdown/key-off occurs.

According to another example aspect of the invention, an independent electronic securement and ignition management method for an electrified vehicle is presented. In one exemplary implementation, the method comprises providing a park pawl system of the electrified vehicle, the park pawl system comprising a park pawl configured to engage/disengage a driveline of the electrified vehicle to selectively inhibit movement of the electrified vehicle, a park pawl actuator configured to physically move the park pawl actuator between engagement/disengagement positions, and primary and a secondary park pawl controllers configured to control park state arbitration and physical movement of the park pawl actuator, respectively, providing an electric parking brake (ePB) of the electrified vehicle configured to engage/disengage to selectively inhibit movement of the electrified vehicle, and providing a vehicle controller connected to the park pawl system via a controller area network (CAN) and detecting, by the vehicle controller, a malfunction of the park pawl system and, in response to detecting the park pawl system malfunction, automatically commanding, by the vehicle controller, the ePB to engage to inhibit movement of the electrified vehicle and without any input from an operator of the vehicle.

In some implementations, the malfunction of the park pawl system is one of (i) a loss of communication via the CAN, (ii) a loss of low voltage power from a low voltage battery system of the electrified vehicle, (iii) a software and/or memory corruption, and (iv) a shorted CAN bus. In some implementations, the method further comprises controlling, by the vehicle controller, a powerdown/key-off of the electrified vehicle when the electrified vehicle is properly secured and based on an operator park request. In some implementations, the electrified vehicle powerdown/key-off inhibits drain of at least one of the low voltage battery system and a high voltage battery system of the electrified vehicle.

In some implementations, the CAN is a CAN flexible data rate (CAN-FD) network and the vehicle controller is a brake system module (BSM), and wherein the loss of communication is on a CAN-FD bus and overrides an operator deselection of an ePB auto-hold feature that automatically engages the ePB when the park pawl is engaged thereby keeping the ePB engaged. In some implementations, the CAN is a high-speed CAN (CAN-C) network and the vehicle controller is a body control module (BCM), wherein the loss of communication is on one of a first CAN (CAN-C1) bus and a second CAN (CAN-C2) bus, wherein signals are added to a remaining operational one of the CAN-C1 and CAN-C2 buses (i) to powerdown the electrified vehicle and (ii) to engage park when requested via the park pawl or, when the park pawl system has malfunctioned, by automatically engaging the ePB.

In some implementations, the park pawl system malfunction is a primary park pawl system controller malfunction that occurs while in drive or while shifting to park and, when not malfunctioning, the secondary park pawl system controller engages the park pawl when a set of conditions are met. In some implementations, the vehicle controller is a brake system module (BSM) and wherein the BSM detects a malfunction indicating one of (i) a loss of communication with the primary park pawl system controller, (ii) a software and/or memory corruption at the primary park pawl system controller, and (iv) a shorted CAN bus. In some implementations, after properly securing and powerdown/key-off of the electrified vehicle, the electrified vehicle is configured to be temporarily woken up in a run prestart mode to provide a period for the ePB to be temporarily disengaged via a technician input and the park pawl to be temporarily disengaged to transfer the electrified vehicle to a towable configuration, and wherein after the period the ePB is reengaged via another technician input and the electrified vehicle is secured and powerdown/key-off occurs.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
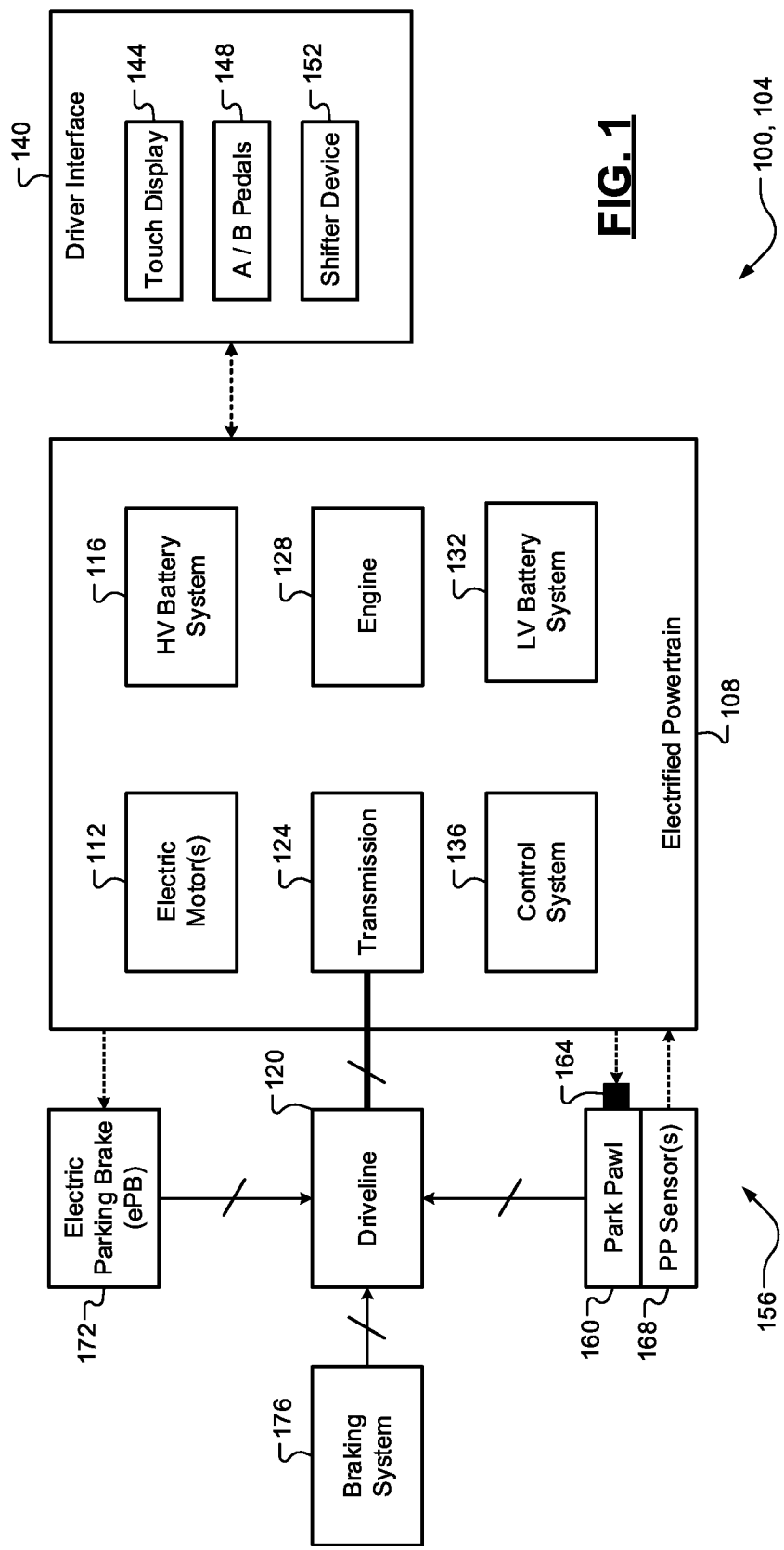
FIG. 1 is a functional block diagram of an electrified vehicle having an example independent electronic securement (e-securement) and ignition management system according to the principles of the present application.

As previously discussed, one conventional electrified vehicle securement strategy is engaging a park pawl to lock-up a transmission/driveline and secure the electrified vehicle from moving. In some scenarios, a controller area network (CAN) malfunction could result in the electrified vehicle not being properly shutdown and these conventional securement strategies would be unable to verifiably secure the electrified vehicle. Accordingly, improved independent electrified vehicle securement and ignition management systems and methods are presented herein. These techniques effectively creates independent securement systems (park pawl and electronic parking brake, or ePB) for a safer securement for electrified vehicles with bi-stable securement systems. These techniques reduce the existing dependency on single source of securement as the primary reason to powerdown the electrified vehicle, such as park pawl engagement to meet government regulations (e.g., Federal Motor Vehicle Safety Standard (FMVSS) requirements, such as FMVSS 114 requirements "5.2.1" and "5.2.3 Key Removal Override option" even with an electrical failure).

Existing ePB systems are capable of holding, i.e., properly securing the electrified vehicle, with the electrified vehicle's gross vehicle weight rating (GVWR) and with an acceptable trailer payload, if applicable, on up to a 20% grade as required. In fact, the ePB systems are often capable of holding/properly securing the electrified vehicle at GVWR with a trailer on a 30% grade. The techniques generally behave the same as any customer request to powerdown during any critical malfunction or fault in the electrified vehicle. The techniques protect electrified vehicles to save high voltage and low voltage battery system state-of-charge (SOC) by powering down, i.e., switching off, the electrified vehicle, when a customer requests a key-off. This avoids unintentionally or inadvertently draining the battery systems (e.g., a 12 volt low voltage battery system and/or a high voltage battery system) to a critical state, which leads to expensive replacements of components. The details of these conventional systems and conventional solutions will be described in greater detail below to further illustrate the aspects and benefits of the present application.

The techniques disclosed herein therefore provide an opportunity to save battery voltage and also provide a service technician an easily capability to tow the electrified vehicle. For example, the electrified vehicle could be moved to a flatbed for towing by temporarily moving the ignition state to a run pre-start mode, during which the ePB could be disengaged via a technician input and, if applicable, the park pawl could be manually disengaged (if already engaged and the electrified vehicle has a manual park release system). During this temporary period, the electrified vehicle could then be maneuvered/transferred the flatbed or another suitable towing apparatus/configuration and then, after the period, the ePB could be reengaged via another technician input and the electrified vehicle could be safely towed to a remote service center for further diagnostics and potential repairs. The proposed solutions are also applicable to electrified vehicles having electronic securement (e-securement) systems with high-speed CAN (also known as "Atlantis-Mid" and "CAN-C") having two CAN buses (CAN C-1 and CAN C-2) and CAN flexible data rate (also known as "Atlantis-High" and "CAN-FD").

Referring now to FIG. 1, a functional block diagram of an electrified vehicle 100 having an example independent electronic securement (e-securement) and ignition management system 104 according to the principles of the present application is illustrated. The electrified vehicle 100 includes an electrified powertrain 108 that generates and transfers drive torque to a driveline 120 for propulsion. The electrified powertrain 108 includes one or more electric motors 112 powered by a high voltage battery system 116 and/or an automatic transmission 124 configured to selectively transfer the drive torque to the driveline 120. The electrified powertrain 108 also optionally includes an internal combustion engine 128 configured to generate drive torque or electrical energy (e.g., a generator) depending on a configuration of the electrified powertrain 108. The electrified powertrain 108 further includes a low voltage (e.g., 12 V) battery system 132 and a control system 136. The control system 136 is configured to control operation of the electrified powertrain 108, such as based on operator input via a driver interface 140 that includes, among other components, a touch display 144, accelerator/brake (A/B) pedals 148 (e.g., for controlling a braking system 176 of the electrified vehicle 100), and a shifter device 152. While a touch display 144 is referenced herein, it will be appreciated that the electrified vehicle 100 could include an alternative or additional type of human-machine interface (HMI), such as an instrument panel cluster (IPC) and thus this could also be referred to as "IPC 144."

Figure 2:
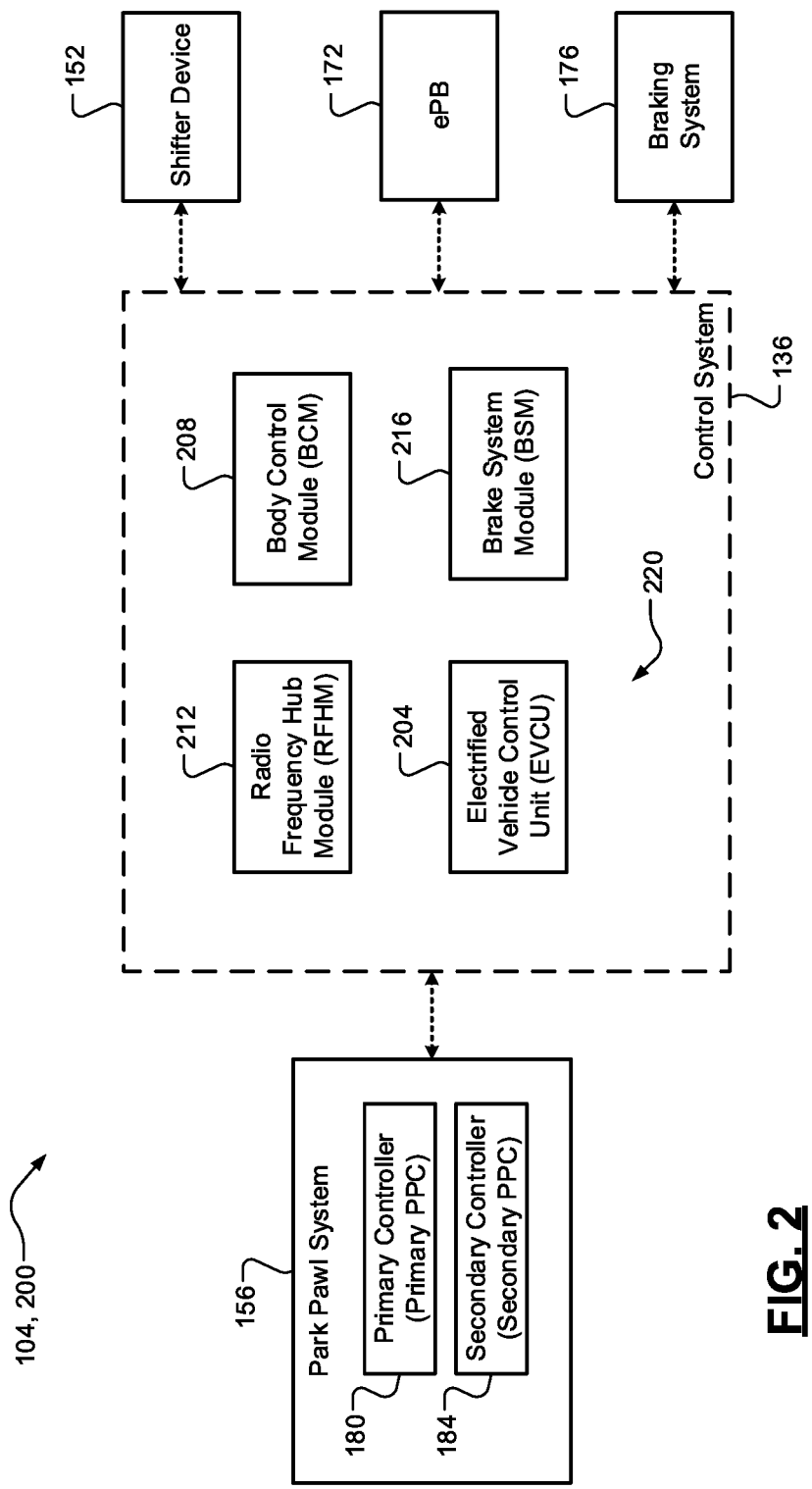
FIG. 2 is a functional block diagram of an example control architecture of the independent e-securement and ignition management system according to the principles of the present application.

A park pawl system 156 includes a park pawl 160 that is selectively engaged/disengaged to lock up the driveline 120 or transmission 124 to inhibit movement of the electrified vehicle 100. The park pawl 160 is actuated by a park pawl actuator 164 and measurements (e.g., position(s) of the park pawl system 156, engagement status, etc.) are monitored by one or more park pawl (PP) sensors 168. The park pawl system 156 also includes one or more controllers (explained in greater detail below) that are part of or separate from the control system 136. An ePB 172 is also configured to selectively provide brake force at the driveline 120 to inhibit movement of the electrified vehicle 100. Referring now to FIG. 2 and with continued reference to FIG. 1, a functional block diagram of an example control architecture 200 of the independent e-securement and ignition management system 104 according to the principles of the present application is illustrated. As mentioned above, the park pawl system 156 can include primary and secondary PP controllers 180, 184 configured to control the park pawl system 156. The primary PP controller 180 is configured as a primary/supervisory controller and PRND arbitrator that depends on and commands the secondary PP controller 184 to engage/disengage the park pawl 160 (directly connected to the PP actuator 164). The control system 136 further includes, among other components, an electrified vehicle control unit (EVCU), a body control module (BCM) 208, a radio frequency hub module (RFHM) 212, and a brake system module (BSM) 216, all configured for communication via a CAN 220. Other non-illustrated components, for example only, could include a hybrid control processor (HCP) and a transmission control module (TCM).

Electrified vehicle powerdown or key-off (powerdown/key-off) is controlled by the coordination of the BCM 208 and the RFHM 212. The RFHM 212 controls a key-in ignition module (KNIM, not shown) to maintain an ignition status as OFF based on the BCM's go ahead, when a customer (e.g., a driver) requests or when a timer expires for ignition management for various ignition management strategies. In some specific architectures, such as Atlantis Mid, the BCM 208 will read the park status (e.g., only on BEV), whereas in other specific architectures, such as Atlantis High, the RFHM 212 directly reads the park state. The BCM 208 and/or RFHM 212 requires the transmission 124 to be in park state to turn of the ignition to meet government standards (e.g., FMVSS 114, requirement "5.2.1" and "5.2.3 Key Removal Override option".) The park state is achieved when the park pawl 160 is engaged. The electrified vehicle 100 does not shut down and thus there is no proper vehicle securement due to loss of communication (LOC), malfunctioned/faulted states (e.g., software/memory corruption(s)), and CAN bus shorts during the following scenarios.

In a first malfunction scenario (1), the EVCU 204 fails to confirm the secured state when the primary PP controller 180 cannot communicate on the CAN bus 220 (even with park achieved) and the BCM 208 or RFHM 212 cannot learn that park has been achieved. In conventional configurations, the customer would need to manually engage the ePB 172 (e.g., press an ePB button via the touch display 144 or another separate button) to secure the electrified vehicle 100. In a second malfunction scenario (2), the EVCU 204 fails to confirm the park state, such as due to a 12 V power loss or a software/memory corruption issue. For vehicles without gated park switch, when the primary PP controller 180 cannot achieve park due to 12 V loss or software/memory corruption, the BCM 208 or the RFHM 212 cannot learn that park has been achieved. In conventional configurations, the customer would needs to press ePB button to secure the electrified vehicle 100. For vehicles with a gated park switch, when the primary PP controller 180 cannot achieve park due to the 12 V power loss, software/memory corruption, or even a malfunctioning gated park switch, the BCM 208 or the RFHM 212 can still learn that park has been achieved, as the gated park switch will be de-asserted due to no power. The customer will be able to apply ePB 172 if the electrified vehicle 100 starts rolling, but hazardous scenarios are possible due to unreliable gated park switch information.

In a third malfunction scenario (3), the CAN bus is shorted. Depending on the CAN configuration, this could be the CAN-C1 bus (not the CAN-C2 bus, for a CAN-C configuration) or the CAN FD3 bus (for a CAN flexible data rate (FD) configuration). During a CAN bus short, park might be achieved, but that information cannot be communicated and thus the BCM 208 or the RFHM 212 cannot learn that park has been achieved. In conventional configurations, the customer would need to press the ePB button to secure the electrified vehicle 100. Other conventional solutions are now described. In malfunction scenarios (1)-(3), the customer needs to manually engage the ePB 172 to secure the electrified vehicle 100 and press a KIN (key-off ignition) button to powerdown the electrified vehicle 100. An HMI message "Automatic Transmission Failure" could be shown on the IPC 144. In some implementations, a dedicated HMI might be shown to cover all cases. There can also be multiple HMIs shown on the conventional engine-based vehicles, but BEV's have a common HMI of "Service Transmission." A customer might accidently exit the electrified vehicle 100 after pressing the KIN button without realizing that the electrified vehicle 100 has been not been properly secured or powered down, which could lead to a vehicle roll away or a drained 12 V battery (the low voltage battery system 132).

In malfunction scenarios (1)-(3) and with a particular 8-speed configuration of the transmission 124, there could be an existing mono-stable park pawl system 156 that could engage park without power. In the case of a transmission controller (e.g., the TCM) losing power, the park pawl 160 automatically gets engaged. This does not ensure that the electrified vehicle 100 might not powerdown due to the mentioned malfunction, resulting in 12 V battery drain. For electrified vehicles having this same transmission 124, there may be no park pawl system 156 and the electrified vehicle 100 could only rely on the ePB 172 for securement. In the event of a 12 V power loss malfunction, however, there will be no securement. Also, in the event of a CAN malfunction, there is no possibility of engaging the ePB 172 since shifter device 152 and ePB 172 communication is on the CAN interface. Other conventional electrified vehicles could run into the following problems: For electrified vehicles having a bi-stable configuration of the park pawl system 156 that engages park without 12 V power due to a capacitor embedded in a microcontroller as a last-shot engagement strategy.

The electrified vehicle, however, might not power down if its PP controller(s) is/are malfunctioning or there is a software/memory corruption. The ePB 172 will be applied when the customer keys-off the vehicle for all cases when the park pawl 160 is engaged, but the electrified vehicle does likely shutdown if the park pawl 160 is in an unconfirmed state with the ePB 172 applied. In electrified vehicles with electronic bi-stable or mono-stable park pawl system or with a manual park lock Systems (where the shifter 152 needs to be moved to park), the shutdown/key off is dependent on the logic of the RFHM 212 of looking at the shifter 152 and transmission state to be in park. In malfunction scenarios (1)-(3), the electrified vehicle 100 is not secured causing the possibility of a vehicle rollaway or the park lock system's supervisory controller cannot communicate that electrified vehicle 100 is secured thereby not shutting down due to the logic of the RFHM 212 and causing a 12 V drain likely leading to 12 V battery replacement. The securement systems such as the ePB 172 for malfunction cases are generally dependent on a PP supervisory controller to communicate for the engagement of the ePB 172 or it will not self-engage to secure the electrified vehicle 100.

The systems/methods of the present application solve the above-described problems (e.g., malfunction scenarios (1)-(3)) by introducing redundancy in communication between ignition and securement modules and independence to self-sufficiently secure the electrified vehicle 100 under circumstances when the primary sources to engage the electrified vehicle 100 are unavailable. In some critical malfunction/fault cases, the customer would normally not be able to understand if he is able to secure the electrified vehicle 100 through manual securement, even if the electrified vehicle 100 is secured, and the electrified vehicle 100 will not shutdown thereby causing customer concerns and additional warranty or customer costs for replacing 12 V batteries. Additional service work at the dealership level could also be required to ensure the high voltage battery pack is correctly serviced/restored. When the HV battery system drains, it requires additional service procedures for recharging the battery and clearing HV battery undervoltage diagnostics. When the primary PP controller 180 malfunctions or otherwise fails to confirm the state of securement, the ePB 172 and the BSM 216 perform a remedial action to engage ePB 172 when the customer requests park in some cases or uses the customer attempt to shutdown the electrified vehicle to secure the vehicle and communicates the vehicle has been secured. This ensures vehicle rollaway is prevented through an automated engagement. The interaction between the BCM 208 and the RFHM 212 interaction for Ignition management ensures that the electrified vehicle is powered down when the vehicle is secured to avoid 12 V battery drain.

Figure 3:
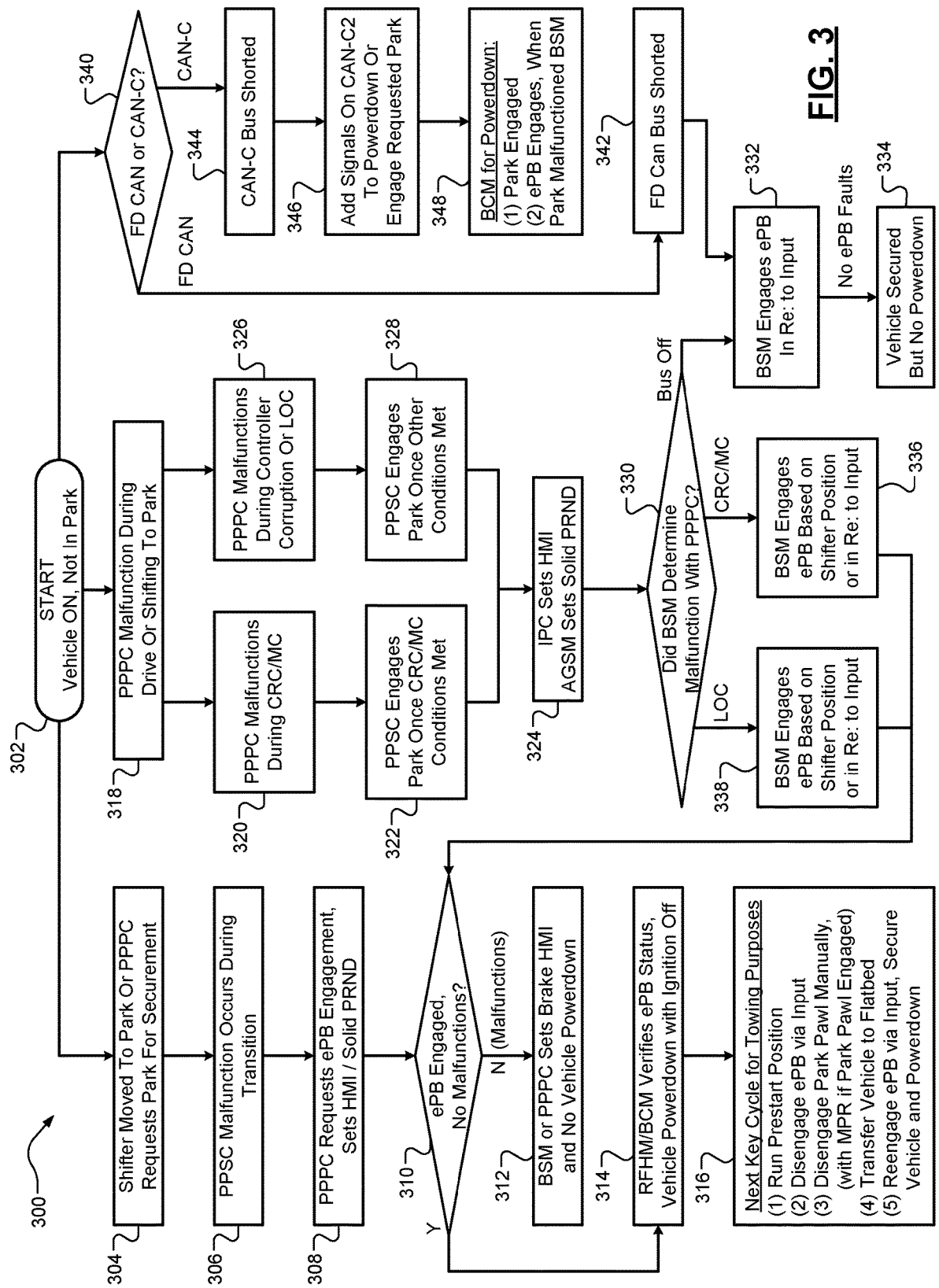
FIG. 3 is a flow diagram of an example independent electronic securement and ignition management method for an electrified vehicle according to the principles of the present application.

Referring now to FIG. 3, a flow diagram of an example independent electronic securement and ignition management method 300 for an electrified vehicle according to the principles of the present application is illustrated. While electrified vehicle 100 and its components are specifically referenced for illustrative and explanatory purposes, it will be appreciated that the method 300 could be applicable to any suitable electrified vehicle. The method 300 begins at 302 where the vehicle 100 is on and the transmission 124 is not in park. From 302, the method 300 could proceed to one of three different branches depending on what is occurring. In a first branch at 304, the shifter 152 is moved to park or the PP primary controller (PPPC) 180 requests park for securement. At 306, a malfunction at the PP secondary controller (PPSC) 184 occurs during the transition as previously described herein. At 308, the PPPC 180 requests engagement of the ePB 172 and sets an HMI (e.g., "Service Transmission") and a solid (non-blinking) PRND state. At 310, it is determined whether the ePB 172 engages with no malfunctions. When false (there are malfunction(s)), the BSM 216 or PPPC 180 sets a brake HMI (e.g., "Press Brake to Prevent Vehicle from Rolling") and the electrified vehicle 100 is not powered down at 312 and the method 300 ends or returns to 302. Otherwise, when true (no malfunctions, at 314 the RFHM 212 and the BCM 208 verify the status of the ePB 172 and the vehicle powers down with ignition-off.

At 316 and on a next key cycle for towing purposes, the following can occur: (1) a technician sets the vehicle in a run prestart mode, (2) the ePB is disengaged via a technician input (e.g., ePB button), (3) the park pawl system 156 is manually disengaged if engaged and a manual park release feature exists), (4) the vehicle 100 is transferred or rolled onto a flatbed, and (5) the ePB 172 is reengaged by another technician input to secure and powerdown the vehicle 100 and the method 300 ends or returns to 302. In a second branch at 318, the PPPC 180 malfunctions while in drive or during a shift to park. At 320, the PPPC 180 malfunctions in drive on any CAN architecture (CAN-C, CAN-FD, etc.) during a software/memory corruption (CRC/MC) malfunction and at 322 the PPSC 184 engages park once condition(s) are met relating to the CRC/MC malfunction and the method 300 proceeds to 324. In a separate sub-branch at 326, the PPPC 180 malfunctions in drive on any CAN architecture during a controller corruption or loss of communication (LOC) malfunction and at 328 the PPSC 184 engages park once condition(s) are met relating to the controller corruption malfunction or the LOC malfunction and the method 300 proceeds to 324. At 324, the IPC 144 and/or other display (e.g., the touch display) sets a transmission HMI (e.g., "Automatic Transmission Fail") and a controller of the shifter 152 (e.g., an automatic gearbox shifter module, or AGSM) sets a solid PRND. The customer can also see the existing PRND state on the IPC 144.

At 330, the BSM 216 determines which malfunction with the PPPC 180 occurred. When a shorted CAN bus malfunction occurred, at 332 the BSM 216 engages the ePB 172 in response to an operator input (e.g., ePB button) and when there are no ePB malfunctions the vehicle 100 is secured but not powered down at 334 and the method 300 ends or returns to 302. When a CRC/MC malfunction occurred, at 336 the BSM 216 engages the ePB 172 according to the position of the shifter device 152 (e.g., park or not park) or in response to an operator input and the method 300 proceeds to 310 in the first branch. When an LOC malfunction occurred, at 338 the BSM 216 engages the ePB 172 according to the position of the shifter device 152 or in response to an operator input and the method 300 proceeds to 310 in the first branch. In a third and final branch at 340, it is determined what CAN architecture/configuration exists-CAN-C or CAN-FD. When CAN-FD, the method 300 proceeds to 342 where a CAN-FD bus short (e.g., CAN-FD3 bus) occurs and is detected and the method 300 proceeds to 332 in the second branch. When CAN-C, the method 300 proceeds to 344 where a CAN-C bus short (CAN-C1 or CAN-C2) occurs and is detected. At 346, communication signals are added on CAN-C2 (or on CAN-C1 is CAN-C2 shorted) to powerdown the vehicle 100 or to engage park when requested. This also includes communication on a redundant CAN to powerdown and engage the requested securement function. At 348, the BCM 208 is utilized for controlling powerdown as follows: (1) when park is engaged and (2) when the ePB 172 engages, provided there is a park malfunction with the BSM 216. The method 300 then ends or returns to 302.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An independent electronic securement and ignition management system for an electrified vehicle, the system comprising:
    a park pawl system comprising:
        a park pawl configured to engage/disengage a driveline of the electrified vehicle to selectively inhibit movement of the electrified vehicle,
        a park pawl actuator configured to physically move the park pawl actuator between engagement/disengagement positions, and
        a primary park pawl controller and a secondary park pawl controller each configured to control park state arbitration and physical movement of the park pawl actuator, respectively;
    an electric parking brake (ePB) configured to engage/disengage to selectively inhibit movement of the electrified vehicle; and
    a vehicle controller connected to the park pawl system via a controller area network (CAN) and configured to:
        detect a malfunction of the park pawl system, and,
        in response to detecting the park pawl system malfunction, automatically command the ePB to engage to inhibit movement of the electrified vehicle and without any input from an operator of the vehicle.

2. The system of claim 1, wherein the malfunction of the park pawl system is one of (i) a loss of communication via the CAN, (ii) a loss of low voltage power from a low voltage battery system of the electrified vehicle, (iii) a software and/or memory corruption, and (iv) a shorted CAN bus.

3. The system of claim 2, wherein the vehicle controller is further configured to control a powerdown/key-off of the electrified vehicle when the electrified vehicle is properly secured and based on an operator park request.

4. The system of claim 3, wherein the electrified vehicle powerdown/key-off inhibits drain of at least one of the low voltage battery system and a high voltage battery system of the electrified vehicle.

5. The system of claim 2, wherein the CAN is a CAN flexible data rate (CAN-FD) network and the vehicle controller is a brake system module (BSM), and wherein the loss of communication is on a CAN-FD bus and overrides an operator deselection of an ePB auto-hold feature that automatically engages the ePB when the park pawl is engaged thereby keeping the ePB engaged.

6. The system of claim 2, wherein the CAN is a high-speed CAN (CAN-C) network and the vehicle controller is a body control module (BCM), wherein the loss of communication is on one of a first CAN (CAN-C1) bus and a second CAN (CAN-C2) bus, and wherein signals are added to a remaining operational one of the CAN-C1 and CAN-C2 buses (i) to powerdown the electrified vehicle and (ii) to engage park when requested via the park pawl or, when the park pawl system has malfunctioned, by automatically engaging the ePB.

7. The system of claim 2, wherein the park pawl system malfunction is a primary park pawl system controller malfunction that occurs while in drive or while shifting to park and, when not malfunctioning, the secondary park pawl system controller engages the park pawl when a set of conditions are met.

8. The system of claim 7, wherein the vehicle controller is a brake system module (BSM) and wherein the BSM detects a malfunction indicating one of (i) a loss of communication with the primary park pawl system controller, (ii) a software and/or memory corruption at the primary park pawl system controller, and (iv) a shorted CAN bus.

9. The system of claim 1, wherein after properly securing and powerdown/key-off of the electrified vehicle, the electrified vehicle is configured to be temporarily woken up in a run prestart mode to provide a period for the ePB to be temporarily disengaged via a technician input and the park pawl to be temporarily disengaged to transfer the electrified vehicle to a towable configuration, and wherein after the period the ePB is reengaged via another technician input and the electrified vehicle is secured and powerdown/key-off occurs.

10. An independent electronic securement and ignition management method for an electrified vehicle, the method comprising:
    providing a park pawl system of the electrified vehicle, the park pawl system comprising:
        a park pawl configured to engage/disengage a driveline of the electrified vehicle to selectively inhibit movement of the electrified vehicle,
        a park pawl actuator configured to physically move the park pawl actuator between engagement/disengagement positions, and
        a primary park pawl controller and a secondary park pawl controller each configured to control park state arbitration and physical movement of the park pawl actuator, respectively; and
    providing an electric parking brake (ePB) of the electrified vehicle configured to engage/disengage to selectively inhibit movement of the electrified vehicle; and
    providing a vehicle controller connected to the park pawl system via a controller area network (CAN) and:
        detecting, by the vehicle controller, a malfunction of the park pawl system, and,
        in response to detecting the park pawl system malfunction, automatically commanding, by the vehicle controller, the ePB to engage to inhibit movement of the electrified vehicle and without any input from an operator of the vehicle.

11. The method of claim 10, wherein the malfunction of the park pawl system is one of (i) a loss of communication via the CAN, (ii) a loss of low voltage power from a low voltage battery system of the electrified vehicle, (iii) a software and/or memory corruption, and (iv) a shorted CAN bus.

12. The method of claim 11, wherein further comprising controlling, by the vehicle controller, a powerdown/key-off of the electrified vehicle when the electrified vehicle is properly secured and based on an operator park request.

13. The method of claim 12, wherein the electrified vehicle powerdown/key-off inhibits drain of at least one of the low voltage battery system and a high voltage battery system of the electrified vehicle.

14. The method of claim 10, wherein the CAN is a CAN flexible data rate (CAN-FD) network and the vehicle controller is a brake system module (BSM), and wherein the loss of communication is on a CAN-FD bus and overrides an operator deselection of an ePB auto-hold feature that automatically engages the ePB when the park pawl is engaged thereby keeping the ePB engaged.

15. The method of claim 11, wherein the CAN is a high-speed CAN (CAN-C) network and the vehicle controller is a body control module (BCM), wherein the loss of communication is on one of a first CAN (CAN-C1) bus and a second CAN (CAN-C2) bus, wherein signals are added to a remaining operational one of the CAN-C1 and CAN-C2 buses (i) to powerdown the electrified vehicle and (ii) to engage park when requested via the park pawl or, when the park pawl system has malfunctioned, by automatically engaging the ePB.

16. The method of claim 11, wherein the park pawl system malfunction is a primary park pawl system controller malfunction that occurs while in drive or while shifting to park and, when not malfunctioning, the secondary park pawl system controller engages the park pawl when a set of conditions are met.

17. The method of claim 16, wherein the vehicle controller is a brake system module (BSM) and wherein the BSM detects a malfunction indicating one of (i) a loss of communication with the primary park pawl system controller, (ii) a software and/or memory corruption at the primary park pawl system controller, and (iv) a shorted CAN bus.

18. The method of claim 10, wherein after properly securing and powerdown/key-off of the electrified vehicle, the electrified vehicle is configured to be temporarily woken up in a run prestart mode to provide a period for the ePB to be temporarily disengaged via a technician input and the park pawl to be temporarily disengaged to transfer the electrified vehicle to a towable configuration, and wherein after the period the ePB is reengaged via another technician input and the electrified vehicle is secured and powerdown/key-off occurs.

* * * * *